(12) United States Patent
Long

(10) Patent No.: US 8,594,098 B2
(45) Date of Patent: Nov. 26, 2013

(54) METHOD, APPARATUS AND SYSTEM FOR TRANSMITTING DATA

(75) Inventor: Hao Long, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/601,291

(22) Filed: Aug. 31, 2012

(65) Prior Publication Data

US 2012/0327940 A1 Dec. 27, 2012

Related U.S. Application Data

(63) Continuation of application No. PCT/CN2011/071442, filed on Mar. 2, 2011.

(30) Foreign Application Priority Data

Mar. 3, 2010 (CN) .......................... 2010 1 0118345

(51) Int. Cl.
*H04L 12/66* (2006.01)
*H04L 12/56* (2011.01)

(52) U.S. Cl.
USPC ............ 370/392; 370/352; 370/389; 370/503

(58) Field of Classification Search
USPC ........... 370/351–395, 464–546; 709/231–237
See application file for complete search history.

(56) References Cited

U.S. PATENT DOCUMENTS

| 6,721,334 | B1 | 4/2004 | Ketcham |
| 7,848,323 | B2 | 12/2010 | He |
| 7,864,740 | B2 | 1/2011 | Yang et al. |
| 2003/0227906 | A1* | 12/2003 | Hallman ....................... 370/352 |
| 2004/0205230 | A1 | 10/2004 | Fontana et al. |
| 2005/0157715 | A1 | 7/2005 | Hiddink et al. |
| 2007/0297411 | A1 | 12/2007 | Zhong |
| 2008/0279181 | A1* | 11/2008 | Shake et al. .................. 370/389 |
| 2009/0207860 | A1 | 8/2009 | Liu |
| 2010/0226652 | A1 | 9/2010 | Vissers et al. |
| 2010/0309930 | A1 | 12/2010 | Harrison et al. |

FOREIGN PATENT DOCUMENTS

| CN | 1984028 | 6/2007 |
| CN | 101022405 A | 8/2007 |
| CN | 101136856 A | 3/2008 |
| CN | 101212390 | 7/2008 |

(Continued)

OTHER PUBLICATIONS

Written Opinion of the International Searching Authority dated Jun. 9, 2011 in connection with International Patent Application No. PCT/CN2011/071442, 5 pages.

(Continued)

*Primary Examiner* — Andrew Lai
*Assistant Examiner* — Chuong M Nguyen

(57) ABSTRACT

The present invention discloses a method, an apparatus, and a system for transmitting data. A method for sending data includes: categorizing a received packet based on field information of a preset field in a packet header; encapsulating, for each category of packets, field information of a preset field in a packet header of a packet to an overhead field of a data unit, and encapsulating a packet payload of each packet and field information of another field except the preset field in a packet header of each packet to a payload field of the data unit; and sending the generated data unit to a destination node of the packet. The method, the apparatus, and the system are capable of improving bandwidth usage of a transmission link.

16 Claims, 6 Drawing Sheets

(56) References Cited

FOREIGN PATENT DOCUMENTS

| | | |
|---|---|---|
| CN | 101212390 A | 7/2008 |
| CN | 101415276 A | 4/2009 |
| CN | 101800750 A | 8/2010 |
| CN | 101834688 A | 9/2010 |
| EP | 1548989 A2 | 6/2005 |
| EP | 1 603 304 A1 | 12/2005 |
| EP | 1 871 068 A1 | 5/2007 |
| JP | 4511993 B2 | 7/2010 |
| WO | WO2008/056916 A1 | 5/2008 |

OTHER PUBLICATIONS

International Search Report dated Jun. 9, 2011 in connection with International Patent Application No. PCT/CN2011/071442.

ITU-T G.984.3, "Gigabit-capable Passive Optical Networks (G-PON): Transmission convergence layer specification", Mar. 2008, 143 pages.

Supplementary European Search Report dated Jan. 7, 2013 in connection with European Patent Application No. EP 11 75 0173.

Partial Translation of Office Action dated Nov. 2, 2011 in connection with Chinese Patent Application No. 201010118345.9.

* cited by examiner

METHOD, APPARATUS AND SYSTEM FOR TRANSMITTING DATA

CROSS-REFERENCE TO RELATED APPLICATIONS

This application is a continuation of International Application No. PCT/CN2011/071442, filed on Mar. 2, 2011, which claims priority to Chinese Patent Application No. 201010118345.9, filed on Mar. 3, 2010, both of which are hereby incorporated by reference in their entireties.

TECHNICAL FIELD

The present invention relates to a data transmission technology, and in particular, to a method, an apparatus, and a system for transmitting data.

BACKGROUND

With development of communications networks, a service interface gradually changes from a time division multiplexing (TDM, Time Division Multiplexing) interface to a packet interface. For a microwave network, a service that a microwave link bears also changes accordingly. A packet service and a TDM service have different features; therefore, different mapping methods are used when a packet of the packet service is multiplexed to a microwave frame.

A common method for mapping a packet to a microwave multiplexing frame is a generic framing procedure (GFP, Generic Framing Procedure) mapping method. In the GFP mapping method, a sending node may perform GFP encapsulation on each received packet, adds a GFP overhead, and thereby form multiple GFP data units. Then, the multiple formed GFP data units are put into a microwave multiplexing frame and transmitted to a destination node of the packet.

However, when the GFP encapsulation is performed on a packet, a GFP overhead of at least eight bytes needs to be added to each packet. A packet actually transmitted over the network, however, generally have small packet length, for example, a voice packet and a Transmission Control Protocol (TCP, Transmission Control Protocol) response packet. When a GFP overhead of eight bytes is added to each packet, the GFP overhead accounts for a large data volume proportion in a GFP data unit that is obtained after the encapsulation, that is, the GFP overhead occupies a lot of link transmission bandwidths, which reduces bandwidth usage of a transmission link.

SUMMARY

In view of this, a technical problem to be solved by the present invention is providing a method, an apparatus, and a system for transmitting data to improve bandwidth usage of a transmission link.

Accordingly, embodiments of the present invention adopts the following technical solutions:

An embodiment of the present invention provides a method for sending data, including:
 categorizing a received packet based on field information of a preset field in a packet header;
 encapsulating, for each category of packets, field information of a preset field in a packet header of a packet to an overhead field of a data unit, and encapsulating a packet payload of each packet and field information of another field except the preset field in a packet header of each packet to a payload field of the data unit; and
 sending the generated data unit to a destination node of the packet.

An embodiment of the present invention provides a method for receiving data, including:
 receiving the data unit, extracting the field information of the preset field in the packet from the overhead field of the data unit, and extracting the packet payload of each packet and the field information of another field except the preset field in the packet header of each packet from the payload field of the data unit; and
 recovering each packet corresponding to the data unit based on the extracted field information of the preset field and the extracted packet payload and field information of another field of each packet.

An embodiment of the present invention provides an apparatus for sending data, including:
 a categorizing unit, configured to categorize a received packet based on field information of a preset field in a packet header;
 an encapsulating unit, configured to encapsulate, for each category of packets, field information of a preset field in a packet header of a packet to an overhead field of a data unit, and encapsulate a packet payload of each packet and field information of another field except the preset field in a packet header of each packet to a payload field of the data unit; and
 a sending unit, configured to send the generated data unit to a destination node of the packet.

An embodiment of the present invention provides an apparatus for receiving data, including:
 an extracting unit, configured to receive the data unit, extract the field information of the preset field in the packet from the overhead field of the data unit, and extract the packet payload of each packet and the field information of another field except the preset field in the packet header of each packet from the payload field of the data unit; and
 a recovering unit, configured to recover each packet corresponding to the data unit based on the extracted field information of the preset field and the extracted packet payload and field information of another field of each packet.

An embodiment of the present invention provides a system for transmitting data, including:
 an apparatus for sending data, configured to categorize a received packet based on field information of a preset field in a packet header; encapsulate, for each category of packets, field information of a preset field in a packet header of a packet to an overhead field of a data unit, and encapsulate a packet payload of each packet and field information of another field except the preset field in a packet header of each packet to a payload field of the data unit; and send the generated data unit to a destination node of the packet; and
 an apparatus for receiving data, configured to receive the data unit, extract the field information of the preset field in the packet from the overhead field of the data unit, and extract the packet payload of each packet and the field information of another field except the preset field in the packet header of each packet from the payload field of the data unit; and recover each packet corresponding to the data unit based on the extracted field information of the preset field and the extracted packet payload and field information of another field of each packet.

Analysis of technical effects of the preceding technical solutions is as follows:

A received packet is categorized based on a preset field in a packet header; each category of packets is encapsulated to a data unit; the generated data unit is sent to a destination node of the packet. That is, each category of packets is encapsulated once, and a data unit corresponding to this category of packets is generated. In this way, only one overhead of the data unit needs to be added for a category of packets, and this category of packets shares the overhead, which greatly reduces a data volume proportion of the overhead of the data unit in the generated data unit, reduces a ratio of link transmission bandwidths used by the overhead of the data unit, and improves the bandwidth usage of the transmission link.

Moreover, when a category of packets is encapsulated to a data unit, field information of preset fields that have the same field content in the packet headers of this category of packets is encapsulated to the overhead field of the data unit, and information except the information about the preset field of each packet is encapsulated to the payload field. In this way, fields with the same information in this category of packets are encapsulated to the overhead field of the data unit, which is shared by multiple packets, further reducing usage of the transmission link bandwidth during transmission of this category of packets and improving the bandwidth usage of the transmission link.

DETAILED DESCRIPTION

Figure 1:
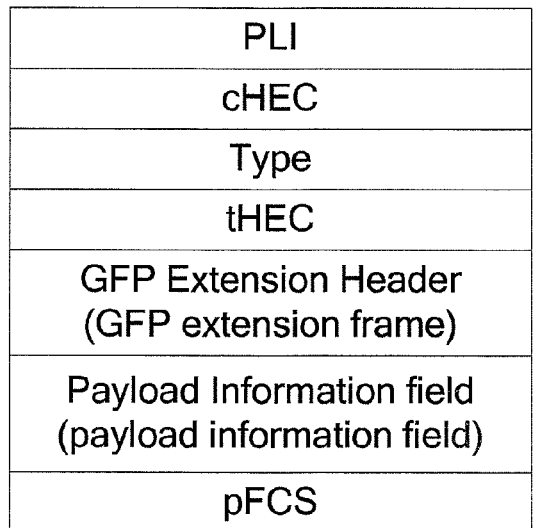
FIG. 1 is a schematic structural diagram of a GFP data unit according to an embodiment of the present invention.

As shown in FIG. 1, a GFP data unit is mainly formed from two parts: a 4-byte GFP frame header (GFP Core Header) and a GFP payload (ranging from 4 to 65535 bytes).

The GFP frame header is formed from a 2-byte frame length indicator (PLI, PDU Length Indicator) and a 2-byte frame header error check (cHEC, Core Header Error Check).

The GFP payload is divided into three parts: a frame header of the payload (Payload Header), a payload information field (Payload Information field), and a 4-byte payload frame check sequence (pFCS, Payload Frame Check Sequence); the pFCS field is optional.

The frame header of the payload is formed by a type (Type), a type Header Error Check (tHEC), and a GFP extension frame header (GFP Extension Header). The GFP extension frame header is optional.

When GFP encapsulation is performed, at least a GFP overhead of four fields PLI, cHEC, Type, and tHEC needs to be added to each packet and the total number of bytes is 8. If the pFCS field or the GFP extension frame header field also needs to be added, the number of bytes of the added GFP overhead is even larger.

Figure 2:
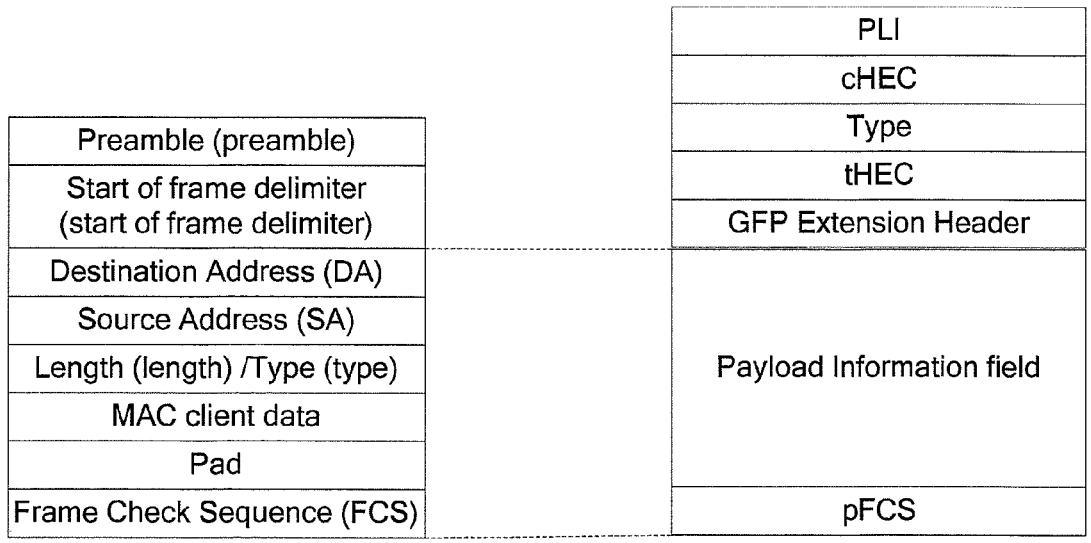
FIG. 2 is a schematic diagram of GFP encapsulation on an Ethernet packet according to an embodiment of the present invention.
Figure 3:
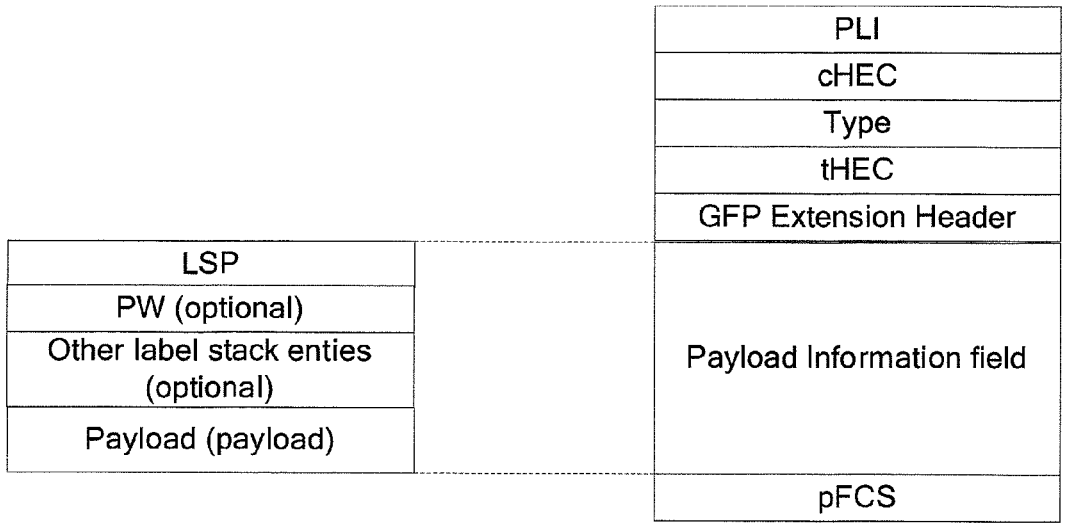
FIG. 3 is a schematic diagram of GFP encapsulation on an MPLS packet according to an embodiment of the present invention.

FIG. 2 is a schematic diagram of GFP encapsulation on an Ethernet packet. Generally, Preamble and Start of frame delimiter fields in the Ethernet packet are removed, and the remaining fields are directly encapsulated to a payload information field of a GFP data unit, and a corresponding GFP overhead is added for the GFP data unit, forming the GFP data unit structure shown in FIG. 1. As shown in FIG. 3, for a multi-protocol label switching (MPLS, Multi-Protocol Label Switching) packet, generally, the MPLS packet is encapsulated into a payload information field of a GFP.

However, in the GFP encapsulation shown in FIG. 2 and FIG. 3, a GFP overhead of at least eight bytes is added for the Ethernet packet and the MPLS packet, and therefore, the GFP overhead occupies a lot of transmission link bandwidths, which reduces bandwidth usage of a transmission link. Especially when the length of the packet is small, the added GFP overhead accounts for a larger proportion in the GFP data unit, which greatly reduces the bandwidth usage of the transmission link.

Based on the preceding, the embodiments of the present invention provide a method, an apparatus, and a system for transmitting data. By encapsulating multiple packets of one category into one data unit, the multiple packets share an overhead field of the data unit, which reduces the data volume proportion of the overhead in the generated data unit and improves the bandwidth usage of the transmission link.

Figure 4:
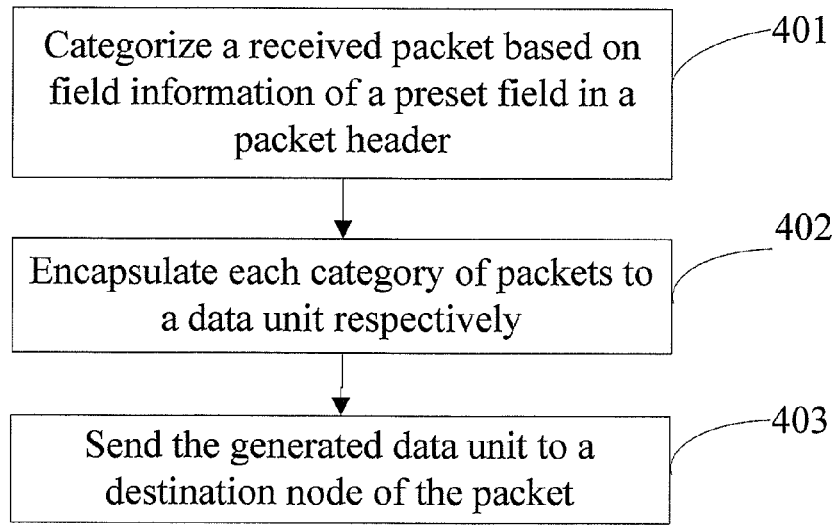
FIG. 4 is a schematic flow chart of a method for sending data according to an embodiment of the present invention.

FIG. 4 is a schematic flowchart of a method for sending data according to an embodiment of the present invention. This method is applicable to a sending node of a packet. As shown in FIG. 4, the method includes:

Step 401: Categorize a received packet based on field information of a preset field in a packet header.

The packet header refers to information located in a packet header area of each packet.

Specifically, packet headers of different types of packets may have different structures and include different fields. Therefore, categorization of packets is performed based on different field information. For example, in the Ethernet packet shown in FIG. 2, preset fields in the packet header may be the following three fields: a destination node (DA), a source node (SA), and a type (Type). In the MPLS packet shown in FIG. 3, the preset field in the packet header may be, for example, an LSP label, or the LSP label and a pseudo wire (PW, Pseudo Wire) label.

The categorization performed based on a packet header of a packet may be: categorizing packets in which field information of preset fields in packet headers is the same into a category.

In a practical application, the packets generally include different types such as the Ethernet packet, the MPLS packet, and an MPLS+PW packet. For each type of packets, the categorization in this step needs to be performed based on whether the field information in the preceding preset fields is same.

Step 402: Encapsulate each category of packets to a data unit respectively.

The data unit is a packet obtained after the encapsulation. For example, when GFP encapsulation is performed on a packet, the data unit is a GFP data unit.

The data unit may be divided into two parts: an overhead field and a payload field. The overhead field generally encapsulates overhead information of a packet, and the payload field encapsulates specific data that needs to be transmitted by the packet. For example, for the GFP data unit, the overhead field may correspond to a GFP frame header field of the GFP data unit, and the payload field corresponds to a GFP payload field of the GFP data unit.

Specific implementation of this step may be:

For each category of packets, field information of a preset field in a packet header of a packet is encapsulated to the overhead field of the data unit, and a packet payload of each packet and field information of another field except the preset field in a packet header of each packet are encapsulated to the payload field of the data unit.

When the packet payload of a packet and the field information of another field except the preset field in the packet header of the packet are encapsulated to the payload field of the data unit, a separator is added between different packets. The separator may be a spacing sequence; for example, the separator is set to a spacing sequence of one byte.

Besides, priority information of each packet is encapsulated together with the packet payload of a corresponding packet and the field information of another field except the preset field in the packet header of the corresponding packet to the payload field of the data unit, or may also be encapsulated to the overhead field, which is not limited herein.

Step 403: Send the generated data unit to a destination node of the packet.

When the data unit is sent out, the data unit may be finally sent to the destination node of the packet only after being forwarded by several intermediate nodes, which is not described in detail herein.

In the method for sending data shown in FIG. 4 according to this embodiment of the present invention, after receiving a packet, a node does not immediately encapsulate each packet but categorizes the received packet, and encapsulates each category of packets once to obtain a data unit corresponding to this category of packets, so that only one data unit is generated for each category of packets. That is, only one overhead of the data unit needs to be added for one category of packets, and this category of packets shares the overhead of the data unit, which greatly reduces a data volume proportion of the overhead in the generated data unit, reduces a ratio of link transmission bandwidths used by the overhead of the data unit, and improves bandwidth usage of a transmission link. Moreover, when a category of packets is encapsulated to a data unit, field information of preset fields that have the same field content in packet headers of this category of packets is encapsulated to the overhead field of the data unit, and information except the information about the preset field of each packet is encapsulated to the payload field. In this way, fields with the same information in this category of packets are encapsulated to the overhead field of the data unit, which is shared by multiple packets, further reducing usage of the transmission link bandwidth during transmission of this category of packets and improving the bandwidth usage of the transmission link.

Figure 5:
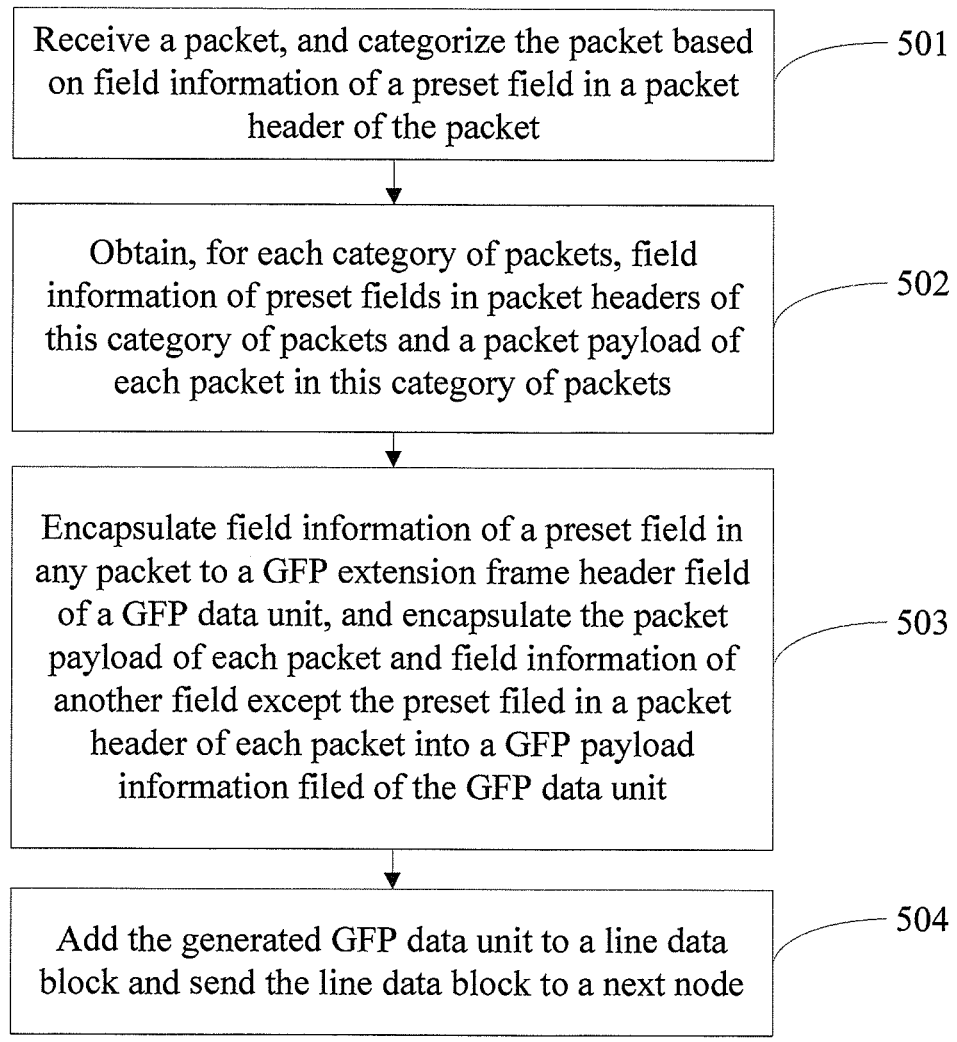
FIG. 5 is a schematic flow chart of another method for sending data according to an embodiment of the present invention.

Based on the method for sending data shown in FIG. 4, a method for sending data according to an embodiment of the present invention is described in detail with reference to FIG. 5. When a packet is encapsulated to obtain a data unit according to this embodiment of the present invention, the encapsulation method may be GFP encapsulation, gigabit passive optical network encapsulation method (GEM G-PON Encapsulation Method) encapsulation, pseudo-wire edge to edge emulation (PWE3, PseudoWire Edge to Edge Emulation) encapsulation, and so on. In FIG. 5, that GFP encapsulation is performed on a packet to obtain a GFP data unit is taken as an example. As shown in FIG. 5, the method includes:

Step 501: Receive a packet, and categorize the packet based on field information of a preset field in a packet header of the packet.

For details, see the description of Step 401, and the details are not provided herein again.

Step 502: Obtain, for each category of packets, field information of preset fields in packet headers of this category of packets and a packet payload of each packet in this category of packets respectively.

The field information of the preset fields of a category of packets is the same. Therefore, generally, only field information of a preset field of any packet in this category of packets needs to be obtained.

Step 503: Encapsulate, for each category of packets, the field information of the preset field in the packet header of any packet to a GFP extension frame header field of a GFP data unit, and encapsulate the packet payload of each packet in this category of packets and field information of another field except the preset field in the packet header into a GFP payload information field of the GFP data unit. By this way we can get GFP data unit corresponding to this category of packets.

In addition, it is better to encapsulate the type (for example, MPLS, Ethernet or MPLS+PW) of this category of packets to a Type field of the GFP data unit so that a receiving node of the GFP data unit may know a specific type of a packet when performing packet recovery.

When using the packet payload of each packet and the field information of another field except the preset field in the packet header as content of the GFP payload information field, a separator needs to be added between different packets, so that a destination node is capable of distinguishing packet payloads and field information of another field except the preset field of different packets after receiving the GFP data unit. The separator is not restricted; for example, a spacing sequence of one byte may be added between two packets.

Priority information of a packet may also be encapsulated to the GFP extension frame header field. In this case, packets of the same category may have different priorities, and therefore, it is better to add priority information of each packet to the GFP extension frame header field. In addition, similar to the packet payload and the field information of another field except the preset field in the packet header, the priority information is separated using the separator so that priority information of different packets is distinguished. Optionally, the priority information of each packet may also be encapsulated together with the packet payload of the packet and the field information of another field except the preset field in the packet header of the packet to the GFP payload information field.

Step 504: Add the generated GFP data unit to a line data block and send the line data block to a next node.

In the method for sending data shown in FIG. 5, a detailed implementation process of performing GFP encapsulation on a packet and sending the packet. Only one GFP overhead needs to be added for one category of packets, and this category of packets shares the GFP overhead, which greatly reduces a data volume proportion of the GFP overhead in the generated GFP data unit, reduces a ratio of link transmission bandwidths used by the GFP overhead, and improves bandwidth usage of a transmission link. Moreover, when a category of packets is encapsulated to a data unit, field information of preset fields that have the same field content in the packet headers of this category of packets is encapsulated to an overhead field of the data unit, and information except the information about the preset field in each packet is encapsulated to a payload field. In this way, fields with the same information in this category of packets are encapsulated to the overhead field of the data unit, which is shared by multiple packets, further reducing usage of the transmission link bandwidth during transmission of this category of packets and improving the bandwidth usage of the transmission link. In addition, the priority information of the packet is also considered, making the method for sending data more perfect and appropriate.

Figure 5A:
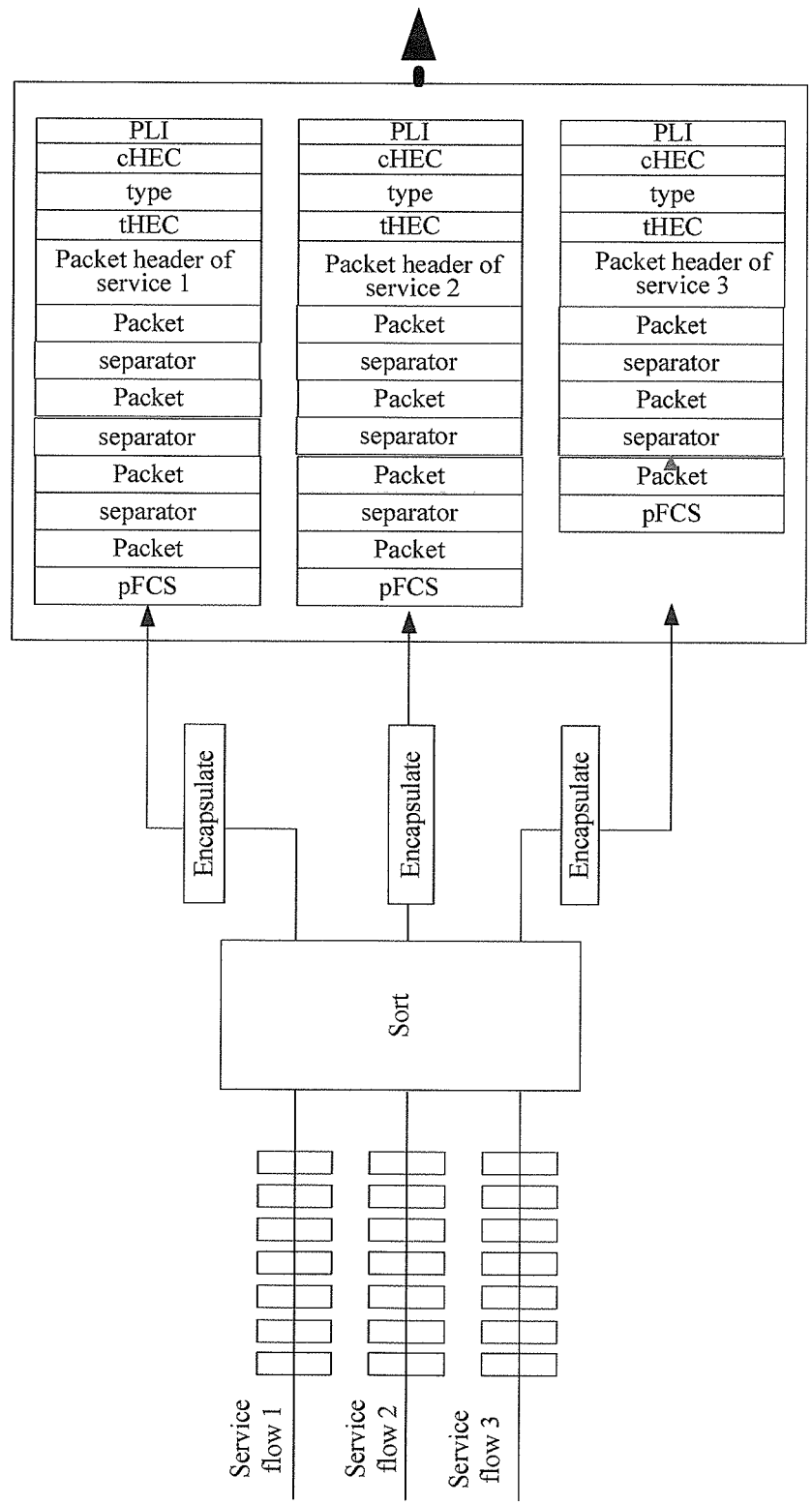
FIG. 5a is a schematic diagram of a direction of a data flow in a node according to an embodiment of the present invention.

In this case, directions of data flows for a node to receive and send packets according to FIG. 5 are shown in FIG. 5a. The node respectively categorizes multiple received service flows formed from different packets, and encapsulates each category of packets obtained after the categorizing into a data unit, and sends out the data unit.

Figure 6:
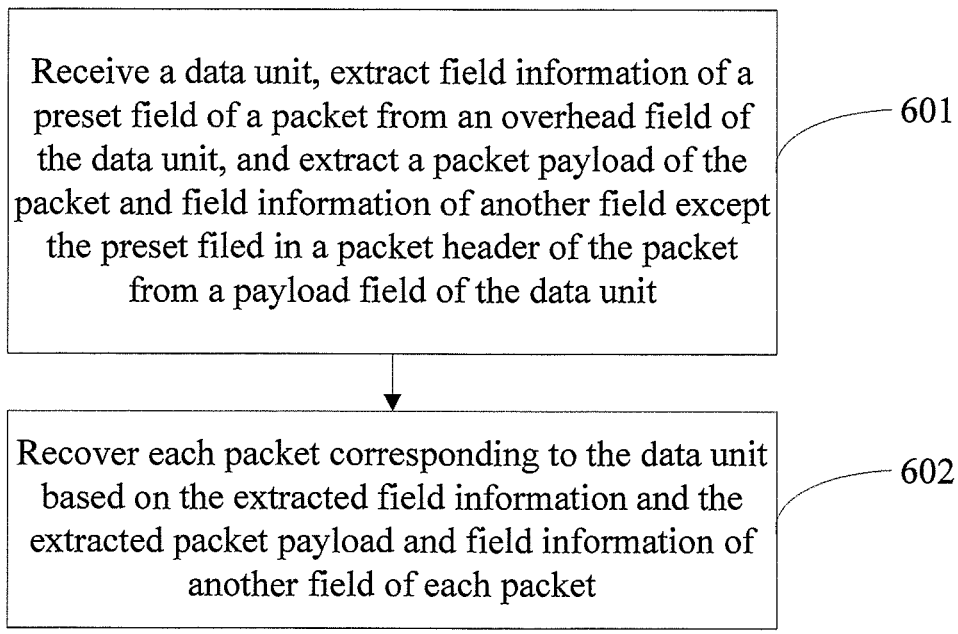
FIG. 6 is a schematic flow chart of a method for receiving data according to an embodiment of the present invention.

Corresponding to the method for sending data shown in FIG. 4 and FIG. 5, an embodiment of the present invention further provides a method for receiving data. The method is applicable to a destination node of a packet. FIG. 6 is a schematic flow chart of a method for receiving data according to an embodiment of the present invention. The method includes:

Step 601: Receive a data unit, extract field information of a preset field in a packet from an overhead field of the data unit, and extract a packet payload of each packet and field information of another field except the preset field in a packet header of each packet from a payload field of the data unit.

When the data unit is a GFP data unit, implementation of this step may be:

obtaining the field information of the preset field of the packet from an extension frame header field of the GFP data unit; and obtaining content of a payload information field of the GFP data unit, splitting the content of the payload information field based on a separator, and obtain the packet payload of each packet and the field information of another field except the preset field in the packet header of each packet.

Step 602: Recover each packet corresponding to the data unit based on the extracted field information and the extracted packet payload and field information of another field of each packet.

Specifically, implementation of this step may be:

recovering, for each packet, a packet header of the packet based on the field information of the preset field and the field information of another field of the packet; and combining the packet header and the packet payload of the packet to obtain a corresponding packet.

Corresponding to the method for sending data, the method for receiving data shown in FIG. 6 recovers a data unit, for example, a GFP data unit, which includes multiple packets, to corresponding packets.

Figure 7:
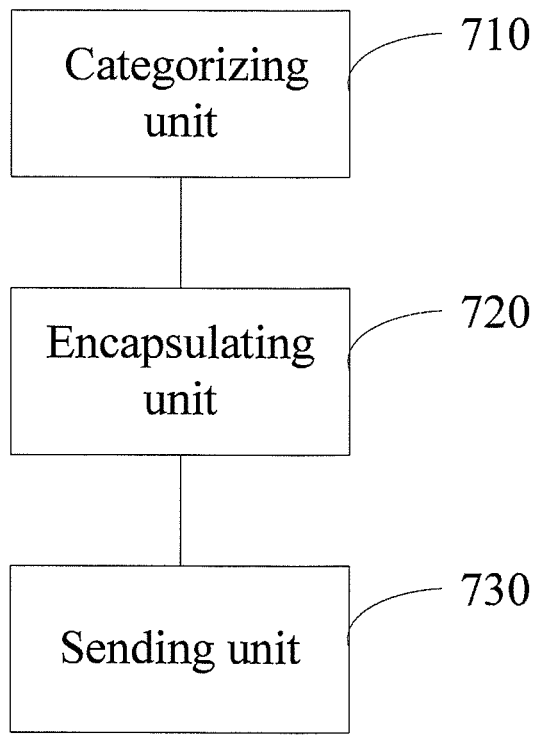
FIG. 7 is a schematic structural diagram of an apparatus for sending data according to an embodiment of the present invention.

Corresponding to the method for sending data according to the embodiment of the present invention, as shown in FIG. 7, an embodiment of the present invention further provides an apparatus for sending data. The apparatus may be set on a sending node of a packet. The apparatus includes:

a categorizing unit 710, configured to categorize a received packet based on field information of a preset field in a packet header;

an encapsulating unit 720, configured to encapsulate, for each category of packets, field information of a preset field in a packet header of any packet to an overhead field of a data unit, and encapsulate a packet payload of each packet and field information of another field except the preset field in a packet header of each packet to a payload field of the data unit; and a sending unit 730, configured to send the generated data unit to a destination node of the packet.

Preferably, the encapsulating unit 720 may also be configured to add a separator between different packets when encapsulating the packet payload of the packet and the field information of another field except the preset field in the packet header of the packet to the payload field of the data unit.

Preferably, the encapsulating unit 720 may also be configured to encapsulate priority information of each packet in each category of packets to the overhead field of a data unit corresponding to this category of packets; or the encapsulating unit 720 may also be configured to encapsulate the priority information of each packet in each category of packets together with a packet payload of a corresponding packet and field information of another field of the corresponding packet to the payload field of the data unit.

In the method for sending data according to an embodiment of the present invention shown in FIG. 7, the categorizing unit categorizes a received packet, and for each category of packets, the encapsulating unit encapsulates the category of packets to a data unit, so that only one data unit is generated for one category of packets. That is, only one overhead of the data unit needs to be added for one category of packets, and this category of packets shares the overhead, which greatly reduces a data volume proportion of the overhead of the data unit in the generated data unit, reduces a ratio of link transmission bandwidths used by the overhead, and improves bandwidth usage of a transmission link. Moreover, when a category of packets is encapsulated to a data unit, field information of preset fields that have the same field content in the packet headers of this category of packets is encapsulated to the overhead field of the data unit, and information except the information about the preset field of each packet is encapsulated to the payload field. In this way, fields with the same information in this category of packets are encapsulated to the overhead field of the data unit, which is shared by multiple packets, further reducing usage of the transmission link bandwidth during transmission of this category of packets and improving the bandwidth usage of the transmission link.

Figure 8:
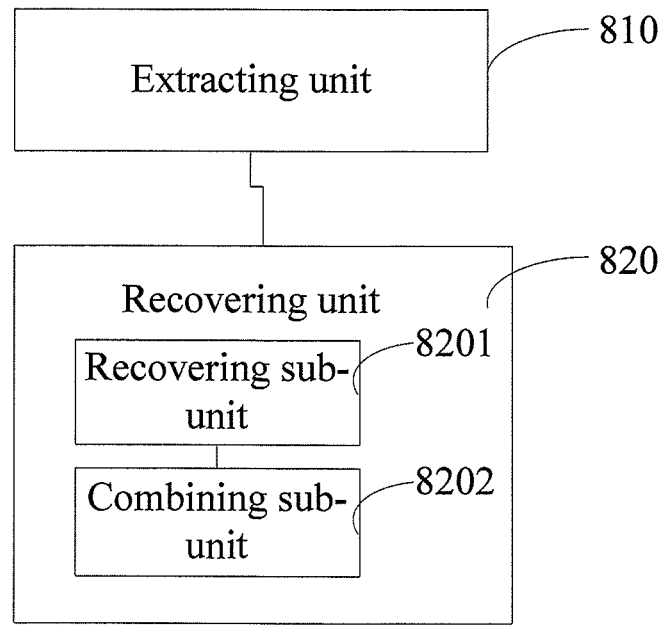
FIG. 8 is a schematic structural diagram of an apparatus for receiving data according to an embodiment of the present invention.

Corresponding to this embodiment of the present invention, an embodiment of the present invention further provides an apparatus for receiving data, which may be set on a receiving node of a packet. As shown in FIG. 8, the apparatus includes:

an extracting unit 810, configured to receive a data unit, extract field information of a preset field in a packet from an overhead field of the data unit, and extract a packet payload of each packet and field information of another field except the preset field in a packet header of each packet from a payload field of the data unit; and a recovering unit 820, configured to recover each packet corresponding to the data unit based on the extracted field information and the extracted packet payload and field information of another field of each packet.

Preferably, the recovering unit may include:

a recovering sub-unit 8201, configured to recover, for each packet, a packet header of the packet based on the field information of the preset field and the field information of another field of the packet; and a combining sub-unit 8202, configured to combine the packet header and the packet payload of the packet to obtain the packet.

Corresponding to the apparatus for sending data, the apparatus for receiving data shown in FIG. 8 is capable of recovering a data unit, for example, a GFP data unit, which includes multiple packets, to corresponding packets.

Figure 9:
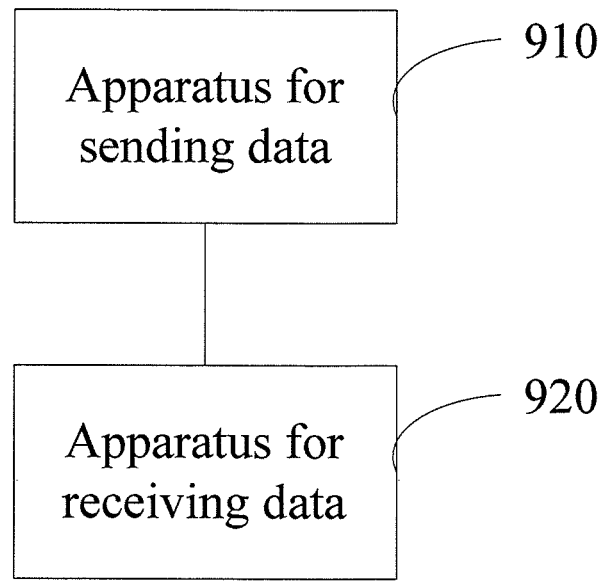
FIG. 9 is a schematic structural diagram of a system for transmitting data according to an embodiment of the present invention.

An embodiment of the present invention further provides a system for transmitting data. As shown in FIG. 9, the apparatus includes:

an apparatus 910 for sending data, configured to categorize a received packet based on field information of a preset field in a packet header; encapsulate, for each category of packets, field information of a preset field in a packet header of any packet to an overhead field of a data unit, and encapsulate a packet payload of each packet and field information of another field except the preset field in a packet header of each packet to a payload field of the data unit; and send the generated data unit to a destination node of the packet; and an apparatus 920 for receiving data, configured to receive the data unit, extract the field information of the preset field in the packet from the overhead field of the data unit, and extract the packet payload of each packet and the field information of another field except the preset field in the packet header of each packet from the payload field of the data unit; and recover each packet corresponding to the data unit based on the extracted field information and the extracted packet payload and field information of another field of each packet.

The system for transmitting data shown in FIG. 9 is capable of encapsulating, through the apparatus for sending data, a category of packets to a data unit, for example, a GFP data unit, so that this category of packets share an overhead of the data unit; and then, recovering, through the apparatus for receiving data, the data unit to multiple packets, which greatly reduces a data volume proportion of the overhead of the data unit in the generated data unit, reduces a ratio of link transmission bandwidth used by the overhead of the data unit, and improves bandwidth usage of a transmission link. Moreover, when a category of packets is encapsulated to a data unit, field information of preset fields that have the same field content in the packet headers of this category of packets is encapsulated to the overhead field of the data unit, and information except the information about the preset field of each packet is encapsulated to the payload field. In this way, fields with the same information in this category of packets are encapsulated to the overhead field of the data unit, which is shared by multiple packets, further reducing usage of the transmission link bandwidth during transmission of this category of packets and improving the bandwidth usage of the transmission link.

It is understandable to those skilled in the art that the processes of the methods for transmitting data in the foregoing embodiments may be performed through relevant hardware instructed by a program. The program may be stored in a computer-readable storage medium. When the program is executed, the corresponding steps in the foregoing methods are performed. The storage medium may be such as a ROM/ RAM, a magnetic disk, a CD-ROM, and so on.

Details above are only exemplary embodiments of the present invention. It should be pointed that those skilled in the art can make various modifications and variations without departing from the spirit and scope of the present invention. These modifications and variations also fall in the protection scope of the present invention.

What is claimed is:

1. A method for sending data, the method comprising:

categorizing a received packet based on field information of a preset field in a packet header;

encapsulating, for each category of packets, field information of a preset field in a packet header of a packet in the category of packets to an overhead field of a data unit, and encapsulating a packet payload and field information of another field except the preset field in a packet header of more than one packet in the category of packets to a payload field of the data unit, wherein the data unit is a Generic Framing Procedure, GFP, data unit; the encapsulating field information of a preset field in a packet header of a packet in the category of packets to an overhead field of a data unit comprises: encapsulating the field information of the preset field in the packet header of the packet in the category of packets to a GFP extension frame header field of the GFP data unit; the encapsulating a packet payload and field information of another field except the preset field in a packet header of more than one packet in the category of packets to a payload field of the data unit comprises:

encapsulating the packet payload and the field information of another field except the preset field in the header field of the more than one packet in the category of packets to a GFP payload information field of the GFP data unit; and sending the GFP data unit to a destination node of the packet.

2. The method according to claim 1, further comprising:

adding a separator between different packets when the packet payload and the field information of another field except the preset field in the packet header of the more than one packet in the category of packets are encapsulated to the payload field of the data unit.

3. The method according to claim 1, wherein when encapsulation processing is performed on each category of packets, the method further comprises:

encapsulating priority information of the more than one packet in the category of packets to an overhead field of a data unit corresponding to this category of packets.

4. The method according to claim 2, wherein when encapsulation processing is performed on each category of packets, the method further comprises:

encapsulating priority information of the more than one packet in the category of packets to an overhead field of a data unit corresponding to this category of packets.

5. The method according to claim 1, wherein when encapsulation processing is performed on each category of packets, the method further comprises:

encapsulating priority information the more than one packet in the category of packets together with the packet payload and the field information of another field of the more than one packet in the category of packets to the payload field of the data unit.

6. The method according to claim 2, wherein when encapsulation processing is performed on each category of packets, the method further comprises:

encapsulating priority information of the more than one packet in the category of packets together with the packet payload of a corresponding packet and the field information of another field of the more than one packet in the category of packets to the payload field of the data unit.

7. A method for receiving data, the method comprising:

receiving a data unit, extracting field information of a preset field in a packet in a category of packets from an overhead field of the data unit, and extracting a packet payload and field information of another field except the preset field in a packet header of more than one packet in the category of packets from a payload field of the data unit, wherein the data unit is a Generic Framing Procedure, GFP, data unit; the extracting field information of a preset field in a packet in a category of packets from an overhead field of the data unit comprises: extracting the field information of the preset field in the packet in the category of packets from a GFP extension frame header field of the GFP data unit; the extracting a packet payload and field information of another field except the preset field in a packet header of more than one packet in the category of packets from a payload field of the data unit comprises: extracting the packet payload and the field information of another field except the preset field in the packet header of the more than one packet in the category of packets from a GFP payload information field of the GFP data unit; and recovering the more than one packet in the category of packets corresponding to the data unit based on the extracted field information of the preset field and the extracted packet payload and field information of another field of the more than one packet in the category of packets.

8. The method according to claim 7, wherein the recovering the more than one packet in the category of packets corresponding to the data unit based on the extracted field information of the preset field and the extracted packet payload and field information of another field of the more than one packet in the category of packets comprises:

recovering, for each packet of the more than one packet in the category of packets, a packet header of the packet based on the field information of the preset field and the field information of another field of the packet; and combining the packet header and the packet payload of the packet to obtain the packet.

9. An apparatus for sending data, the apparatus comprising:

a categorizing unit, configured to categorize a received packet based on field information of a preset field in a packet header;

an encapsulating unit, configured to encapsulate, for each category of packets, field information of a preset field in a packet header of a packet in the category of packets to an overhead field of a data unit, and encapsulate a packet payload and field information of another field except the preset field in a packet header of more than one packet in the category of packets to a payload field of the data unit, wherein the data unit is a Generic Framing Procedure, GFP, data unit; the encapsulate field information of a preset field in a packet header of a packet in the category of packets to an overhead field of a data unit comprises: encapsulate the field information of the preset field in the packet header of the packet in the category of packets to a GFP extension frame header field of the GFP data unit; the encapsulate a packet payload of and field information of another field except the preset field in a packet header of more than one packet in the category of packets to a payload field of the data unit comprises: encapsulate the packet payload and the field information of another field except the preset field in the header field of more than one packet in the category of packets to a GFP payload information field of the GFP data unit; and a sending unit, configured to send the GFP data unit to a destination node of the packet.

10. The apparatus according to claim 9, wherein the encapsulating unit is further configured to: add a separator between different packets when encapsulating the packet payload and the field information of another field except the preset field in the packet header of the more than one packet in the category of packets to the payload field of the data unit.

11. The apparatus according to claim 9, wherein the encapsulating unit is further configured to: encapsulate priority information of the more than one packet in the category of packets to an overhead field of a data unit corresponding to this category of packets.

12. The apparatus according to claim 10, wherein the encapsulating unit is further configured to: encapsulate priority information of the more than one packet in the category of packets to an overhead field of a data unit corresponding to this category of packets.

13. The apparatus according to claim 9, wherein the encapsulating unit is further configured to:

encapsulate priority information the more than one packet in the category of packets together with the packet payload and the field information of another field of the more than one packet in the category of packets to the payload field of the data unit.

14. The apparatus according to claim 10, wherein the encapsulating unit is further configured to:

encapsulate priority information of the more than one packet in the category of packets together with the packet payload and the field information of another field of the more than one packet in the category of packets to the payload field of the data unit.

15. An apparatus for receiving data, the apparatus comprising:

an extracting unit, configured to receive a data unit, extract field information of a preset field in a packet in a category of packets from an overhead field of the data unit, extract a packet payload and field information of another field except the preset field in a packet header of more than one packet in the category of packets from a payload field of the data unit, wherein the data unit is a Generic Framing Procedure, GFP, data unit; the extract field information of a preset field in a packet in a category of packets from an overhead field of the data unit comprises: extract the field information of the preset field in the packet in the category of packets from a GFP extension frame header field of the GFP data unit; the extract a packet payload and field information of another field except the preset field in a packet header of more than one packet in the category of packets from a payload field of the data unit comprises: extract the packet payload and the field information of another field except the preset field in the packet header of the more than one packet in the category of packets from a GFP payload information field of the GFP data unit; and a recovering unit, configured to recover the more than one packet in the category of packets corresponding to the data unit based on the extracted field information of the preset field and the extracted packet payload and field information of another field of the more than one packet in the category of packets.

16. The apparatus according to claim 15, wherein the recovering unit comprises:

a recovering sub-unit, configured to recover, for each packet of the more than one packet in the category of packets, a packet header of the packet based on the field information of the preset field and the field information of another field of the packet; and a combining sub-unit, configured to combine the packet header and the packet payload of the packet to obtain the packet.

* * * * *